United States Patent
Ali-Hackl et al.

(10) Patent No.: US 7,804,814 B2
(45) Date of Patent: Sep. 28, 2010

(54) POWER CONTROL FOR A MOBILE RADIO COMMUNICATION SYSTEM

(75) Inventors: Markus Ali-Hackl, Germering (DE); Volker Breuer, Bötzow (DE); Frederic Charpentier, Berlin (DE); Stefan Fritze, Haar (DE)

(73) Assignee: Siemens Aktiengesellschaft, Munich (DE)

( * ) Notice: Subject to any disclaimer, the term of this patent is extended or adjusted under 35 U.S.C. 154(b) by 1227 days.

(21) Appl. No.: 10/560,517

(22) PCT Filed: Jun. 11, 2004

(86) PCT No.: PCT/EP2004/051093

§ 371 (c)(1),
(2), (4) Date: Dec. 13, 2005

(87) PCT Pub. No.: WO2004/112277

PCT Pub. Date: Dec. 23, 2004

(65) Prior Publication Data

US 2006/0120332 A1    Jun. 8, 2006

(30) Foreign Application Priority Data

Jun. 13, 2003   (EP) ................... 03013571

(51) Int. Cl.
*H04J 3/06*    (2006.01)

(52) U.S. Cl. ............ 370/350; 370/318; 455/13.4; 455/522; 455/127.1

(58) Field of Classification Search ........... 370/350, 370/318; 455/13.4, 522, 127.1
See application file for complete search history.

(56) References Cited

U.S. PATENT DOCUMENTS

| 6,064,659 | A | 5/2000 | Ahmed et al. | |
|---|---|---|---|---|
| 6,804,214 | B1 * | 10/2004 | Lundh et al. | 370/335 |
| 6,888,880 | B2 * | 5/2005 | Lee et al. | 375/149 |
| 7,295,597 | B2 * | 11/2007 | Fitton et al. | 375/148 |
| 7,352,737 | B2 * | 4/2008 | Blanz et al. | 370/350 |
| 7,386,032 | B2 * | 6/2008 | Fitton et al. | 375/147 |
| 2001/0021199 | A1 * | 9/2001 | Lee et al. | 370/503 |
| 2002/0077141 | A1 * | 6/2002 | Hwang et al. | 455/522 |

(Continued)

FOREIGN PATENT DOCUMENTS

EP    0 887 947    12/1998

(Continued)

OTHER PUBLICATIONS

3GPP TS 25.211 Version 4.3.0 Release 4, Dec. 2001: "Physical Channels and Mapping of Transport Channels Onto Physical Channels (FDD)", XP002260121.

(Continued)

*Primary Examiner*—Daniell L Negrón
*Assistant Examiner*—Huy D Nguyen
(74) *Attorney, Agent, or Firm*—King & Spalding L.L.P.

(57) ABSTRACT

A communication system having a plurality of common channels and includes a primary common control physical channel, a plurality of dedicated channels and a synchronization channel (SCH). The primary common control physical channel and the synchronization channel are transmitted time multiplexed, and the sum transmit power of dedicated channels is reduced during the transmission of the synchronization channel in order to keep the total output power at the base station power amplifier below a maximum power limit.

14 Claims, 3 Drawing Sheets

U.S. PATENT DOCUMENTS

| | | | |
|---|---|---|---|
| 2003/0064682 A1* | 4/2003 | Iwamura | 455/13.4 |
| 2003/0119452 A1* | 6/2003 | Kim et al. | 455/69 |
| 2004/0017843 A1* | 1/2004 | Fitton et al. | 375/148 |
| 2004/0028121 A1* | 2/2004 | Fitton | 375/144 |
| 2005/0053049 A1* | 3/2005 | Blanz et al. | 370/350 |
| 2005/0159118 A1* | 7/2005 | Jin et al. | 455/127.2 |

FOREIGN PATENT DOCUMENTS

| | | |
|---|---|---|
| JP | 2002217828 | 8/2002 |
| JP | 2003516001 T | 5/2003 |
| WO | 01/39540 | 5/2001 |
| WO | WO 01/39540 | 5/2001 |
| WO | WO 03/079576 | 9/2003 |

OTHER PUBLICATIONS

3GPP TSG-RAN Working Group 4 (Radio) Meeting #28, 'Online! Aug. 18, 2003: "Test Case Parameter for Multi-Path Fading Intra-Frequency Cell Identification", XP002292907, Sophia Antipolis, France.

3GPP TS 25.101 Version 4.7.0 Release Mar. 4, 2003: "UE Radio Transmission and Reception (FDD)".

3GPP TS 25.133 Version 4.8.0 Release Mar. 4, 2003: "Requirements for Support of Radio Resource Management (FDD)".

TSG-RAN Working Group 4 (Radio) Meeting #25, R4-021580, Secaucus, New Jersey, USA Nov. 11-15, 2002: "On Cell Identification in Multi-Path Fading Conditions".

XP 002260121-3GPP: "Physical channels and mapping of transport channels onto physical channels (FDD)", Version 4.3.0, Release 4, Dec. 2001, pp. 25, 26, 29, 38.

Siemens: "Test case parameter for multi-path fading intra-frequency cell identification", XP 002292907, Aug. 18, 2003.

"3$^{rd}$ Generation Partnership Project; Technical Specification Group Radio Access Network; Physical Channels and Mapping of Transport Channels onto Physical Channels (FDD)", 3GPP TS 25:211, V4.5.0, Jun. 2002.

* cited by examiner

POWER CONTROL FOR A MOBILE RADIO COMMUNICATION SYSTEM

FIELD OF TECHNOLOGY

The present disclosure relates to a communications system, particularly to a Universal Mobile Telecommunications System (UMTS), a method for transmitting data in a communications system, and a base station system.

BACKGROUND

Transmitted data at a base station of a 3GPP W-CDMA (FDD) cellular radio system can be divided into time continuous traffic (DCH, CCH) and burst like control data, that includes the synchronization channel (SCH) [2]. The SCH is time multiplexed with the primary common control physical channel (P-CCPCH). Traditional network configuration assumes equal power (transmit power) for SCH and P-CCPCH such that the sum power level (also denoted as "total transmit power of the used channels") is constant over time. This situation is illustrated in FIG. 1. "BS-Power" means the transmit power at the base station. It is further noted that the CDMA system capacity is limited by its self interference, which is particularly caused by all non desired users and the control channels. Thus the capacity is given by the ratio of area of the DCH block divided by the total area in FIG. 1. The sum transmit power of the dedicated downlink channels (also denoted as "transmit power of dedicated channels", "total, transmit power of the dedicated downlink channels") is regularly constant within one time slot.

Currently, it is a standard requirement that also the DCH-power of each traffic channel is either constant during the whole slot (time slot) or may change with fixed power steps at more or less random time instances within the slot. These instances are random in time because of the many different DCH slot formats and the additional timing offset for each DCH relative to the SCH [2]. This is also illustrated in FIG. 1.

In the context of "identification of a new cell", it has been recognized that an increased power level for the SCH compared to the P-CCPCH is necessary. This is meanwhile reflected in a respective change of standard requirements (see [3], [4]).

FIG. 1 and FIG. 2 show a dashed line, which represents a maximum power amplifier (PA) level at the base station (BS) (also denoted as "amplifier power limit", "maximum power limit"). This level is a meaningful design parameter of a base station since it has significant impact on cost, size and power consumption of the whole base station.

Currently the 3GPP standard allows an increase of the SCH power only in a way as depicted in FIG. 2. A discontinuity of the transmitted power (also denoted as "total transmit power of the used channels", "total output power at the base station power amplifier", "sum power") over time is introduced. Two power budged options are shown in FIG. 2:

Option one on the left hand side keeps the sum power always below the "amplifier power limit". The spectral distortion of the BS transmit signal due to discontinuity can be neglected. The system capacity, however, is considerably reduced, because the total DCH-power (area of the DCH block) compared to the sum power is reduced.

Option two on the right hand side of FIG. 2 exploits the full mean power the base station (sum area of all channels corresponds to "maximum mean power") and the capacity loss is relatively low. The peak power, however, is increased and due to the non-linearity of the BS power amplifier, spectral distortion of the transmit signal occurs.

The change of requirements, which demands for increased SCH-level, is quite new. Based on the current W-CDMA standard known solutions are shown in FIG. 2. This means either considerable system capacity loss or more expensive, larger and less efficient power amplifier.

SUMMARY

Based on the foregoing description, a communications system, a method for transmitting data and a base station system is disclosed for enabling, that enable a reliable synchronisation in a communications system.

Under the disclosed exemplary embodiment, the reduction of the transmit power of the dedicated channels can be different for different dedicated channels, particularly in dependence on the different quality of service requirements assigned to the dedicated channels.

Each dedicated channel can be related to one mobile station. Some dedicated channels can be related to the same mobile station.

Each common channel can be related to at least two mobile stations.

Of course it lies also within the scope of this invention to execute the invention only within certain parts or base station systems of a communications system or within certain predefined time intervals.

Preferably the plurality of common channels. (P-CCPCH, CCH) under the embodiment include a primary common control physical channel (P-CCPCH) and/or a plurality of dedicated channels (DCH) and/or a synchronisation channel (SCH), and are realized by a specific base station or base station system. The transmit power of dedicated channels (DCH) is reduced during the transmission of the synchronisation channel (SCH) and the total transmit power of the dedicated downlink channels are realized by this base station or base station system.

Furthermore, other common channels or dedicated channels within the communications system may be realized by other base stations or base station systems. One or more of these base stations or base stations systems can also be arranged such, that the transmit power of dedicated channels (DCH) being reduced during the transmission of a synchronisation channel (SCH) by one of these base stations or base station systems is the total transmit power of the dedicated downlink channels realised by this base station or base station system.

One result of this configuration is that the sum power over all physical channels are kept at a constant level, and the DCH power is decreased during SCH-transmission.

Another advantage gained by the traffic channel cutback (DCH power reduction during SCH transmission) are that the cutback during SCH transmission balances the sum power along the slot. This improves the spectral behaviour of the (power limited) amplifier and makes the power amplifier cheaper, smaller and more efficient. The system capacity degradation is relatively low since the total power assigned to DCH-traffic is high.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
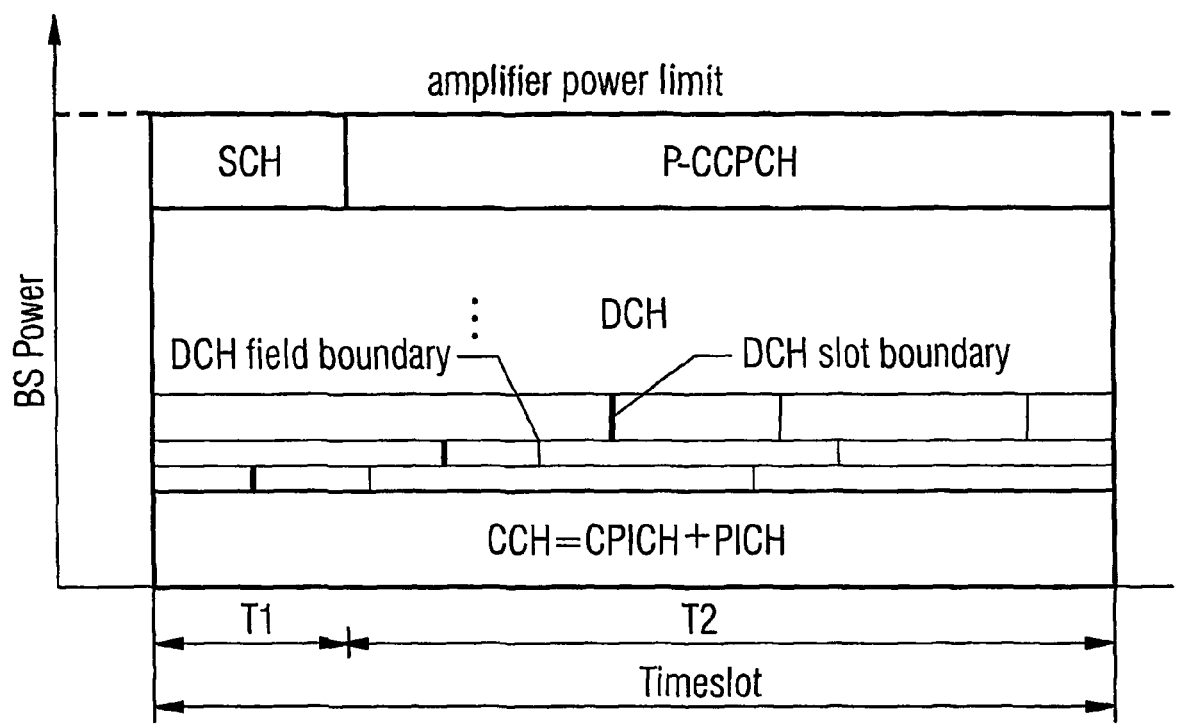
FIG. 1 illustrates a conventional power budget of W-CDMA physical channels at the base station.
Figure 2:
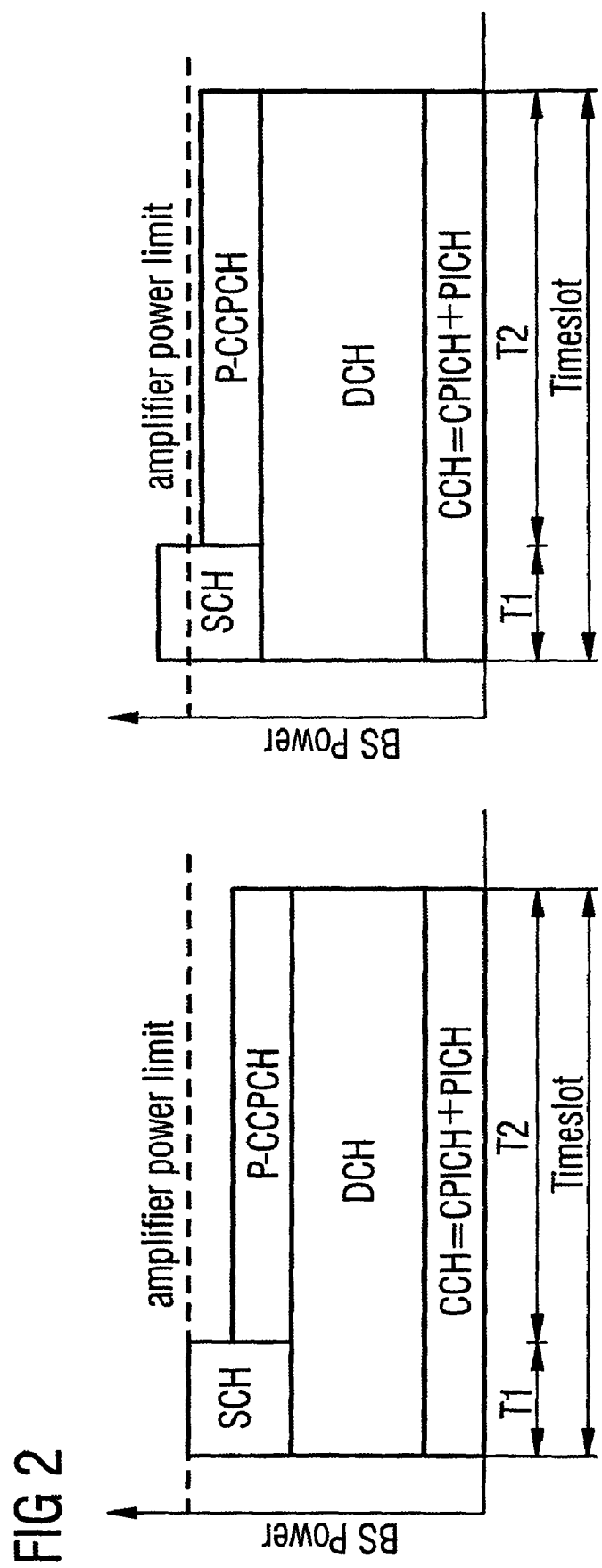
FIG. 2 illustrates a conventional power distribution of W-CDMA physical channels at the base station to cope with new requirement for cell.
Figure 3:
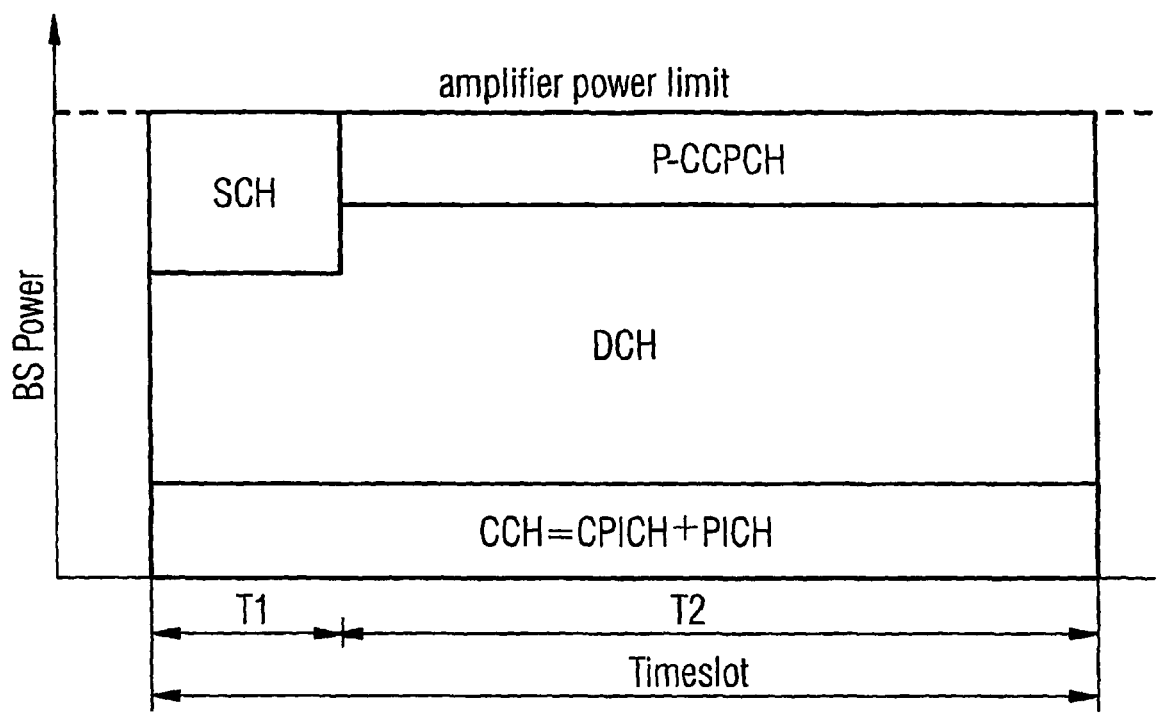
FIG. 3 illustrates a schematic view of a reduction of the DCH transmit power ("Traffic Channel Cutback"), under an exemplary embodiment.

The graph in FIG. 3 shows the transmit power (BS power) of the transmit amplifier of a base station over time.

The power of a plurality of common channels (P-CCPCH, CCH) including a primary common control physical channel (P-CCPCH) is shown as well as the sum transmit power of the dedicated downlink channels (also denoted as "transmit power of dedicated channels") (DCH). Preferably these channels are realised by one base station.

The transmit power of the synchronisation channel (SCH) in FIG. 3 exceeds the transmit power of the primary common control physical channel (P-CCPCH) that is transmitted time multiplexed with the synchronisation channel (SCH).

The sum transmit power of the dedicated downlink channels (also denoted as "transmit power of dedicated channels") (DCH) is reduced during the transmission of the synchronisation channel (SCH).

The communications system is a Wide-Band-CDMA-System (W-CDMA) in particular a Universal Mobile Telecommunications System (UMTS), and the common channels and the dedicated channels are transmitted code multiplexed.

The reduction of the transmit power of dedicated channels (DCH) is such that the total transmit power of the used channels (total output power at the base station power amplifier) is not above an amplifier power limit and preferably remains substantially constant.

The transmit power of the dedicated channels is reduced during the transmission of the synchronisation channel (SCH) by the difference between the transmit power of the synchronisation channel (SCH) and the transmit power of the primary common control physical channel (P-CCPCH).

The transmit power of dedicated channels (DCH) is reduced at the beginning of the synchronisation channel (SCH), and the transmit power of dedicated channels (DCH) is increased at the end of the synchronisation channel (SCH).

The reduction of the transmit power of dedicated channels (DCH) during the transmission of the synchronisation channel (SCH) is triggered in dependence on information about the synchronisation channel timing. This information is preferably stored in a memory unit of or assigned to the base station system.

The reduction of the transmit power of dedicated channels is such that the total transmit power of the used channels is substantially constant and not above an amplifier power limit (1) just before the transmission of the synchronisation channel, (2) just after the transmission of the synchronisation channel and (3) during the transmission of the synchronisation channel.

The total transmit power of the used channels may also be changed later due to lower traffic demands.

The sum transmit power of the downlink dedicated channels (DCH) is reduced during the transmission of the synchronisation channel (SCH) in order to keep the total output power at the base station power amplifier below a maximum power limit.

With regard to FIG. 3 it should be noted, that the signal level reduction occurs asynchronously to the DCH slot and field boundaries.

Other embodiments may be derived from the present disclosure without deviating from the teachings disclosed herein. These embodiments include:

Switching between a fully loaded and a partially loaded system: DCH truncation (DCH power reduction during SCH transmission) is turned off in case of a partially loaded system. The spectral degradation due to sum power bursts (SCH) are not critical and individual link quality can be kept optimum instead.

Selective reduction of DCH level during SCH transmission based on service specific quality requirements or certain DCH-fields.

A communications system for realizing the present disclosure includes one or more base station systems that are connected with each other and/or with other communications systems via one or more mobile switching centers. Data is transmitted via downlink channels from the base station system to mobile stations and via uplink channels from mobile stations to the base station system. Thus a communication between mobile stations is enabled. The base station systems show a processing unit that is arranged such, that the primary common control physical channel (P-CCPCH) and the synchronisation channel (SCH) are transmitted time multiplexed, and that the transmit power of dedicated channels (DCH) is reduced during the transmission of the synchronisation channel (SCH).

It should be understood that the various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

REFERENCES

[1] 3GPP TS25.101 V3.13.0 (2003 March): UE Radio Transmission and Reception (FDD)

[2] 3GPP TS25.211 V3.12.0 (2002 October): Physical channels 5 and mapping of transport channels onto physical channels (FDD)

[3] 3GPP TS25.133 V3.13.0 (2003 March): Requirements for Support of Radio Resource Management (FDD)

[4] TSG-RAN WG4#25, R4-021580: On Cell Identification in Multi-Path Fading Conditions.

The invention claimed is:

1. A communication system comprising:
a plurality of common channels that include a primary common control physical channel;
a plurality of dedicated channels; and
a synchronization channel;
wherein the primary common control physical channel and the synchronization channel are transmitted time multiplexed; and wherein a transmit power of the dedicated channels is reduced during the transmission of the synchronization channel.

2. The communications system according to claim 1; wherein the common channels and the dedicated channels are transmitted code multiplexed.

3. The communications system according to claim 1, wherein the communications system is a Wide-Band-CDMA-System.

4. The communications system according to claim 1, wherein the communications system is a Universal Mobile Telecommunications System.

5. The communications system according to claim 1, wherein the reduction of the transmit power of the dedicated channels is such that the total transmit power of the used channels is substantially constant.

6. The communications system according to claim 1, wherein the reduction of the transmit power of the dedicated channels is such that the total transmit power of the used channels is substantially constant and not above an amplifier power limit.

7. The communications system according to claim 1, wherein the transmit power of the dedicated channels is reduced during the transmission of the synchronization channel by the difference between the transmit power of the synchronization channel and the transmit channel of the primary common control physical channel.

8. The communications system according to claim 1, wherein the transmit power of the dedicated channels is reduced at the beginning of the transmission of the synchronization channel, and the transmit power of the dedicated channels is increased at the end of the transmission of the synchronization channel.

9. The communications system according to claim 1, wherein the transmit power of the dedicated channels is reduced at the beginning of the transmission of the synchronization channel by the difference between the transmit power of the synchronization channel and the transmit power of the primary common control physical channel, and wherein the transmit power of dedicated channels is increased at the end of the transmission of the synchronization channel by the difference between the transmit power of the synchronization channel and the transmit power of the primary common control physical channel.

10. The communications system according to claim 1, wherein the reduction of the transmit power of the dedicated channels during the transmission of the synchronization channel is triggered by information received on synchronization channel timing.

11. The communications system according to claim 1, wherein the reduction of the transmit power of the dedicated channels is such that the total transmit power of the used channels is substantially constant and not above an amplifier power limit (1) just before the transmission of the synchronization channel, (2) just after the transmission of the synchronization channel and (3) during the transmission of the synchronization channel.

12. The communications system according to claim 1, wherein a sum transmit power of the dedicated channels during downlink is reduced during the transmission of the synchronization channel in order to keep the total output power at the base station power amplifier below a maximum power limit.

13. A method for transmitting data in a communications system, comprising:
    transmitting a primary common control physical channel and a synchronization channel time multiplexed; and
    reducing the transmit power of dedicated channels during the transmission of the synchronization channel.

14. A base station for transmitting data in a communications system, comprising:
    a plurality of common channels that include a primary common control physical channel; and
    a plurality of dedicated channels; and
    a synchronization channel,
    wherein the base station system is arranged such that the primary common control physical channel and the synchronization channel are transmitted time multiplexed, and the transmit power of dedicated channels is partially reduced during the transmission of the synchronization channel.

* * * * *